(12) United States Patent
Nakari

(10) Patent No.: US 10,899,579 B2
(45) Date of Patent: Jan. 26, 2021

(54) ELEVATOR BRAKE CONTROLLER

(71) Applicant: KONE Corporation, Helsinki (FI)

(72) Inventor: Arto Nakari, Helsinki (FI)

(73) Assignee: KONE CORPORATION, Helsinki (FI)

( * ) Notice: Subject to any disclaimer, the term of this patent is extended or adjusted under 35 U.S.C. 154(b) by 546 days.

(21) Appl. No.: 15/694,396

(22) Filed: Sep. 1, 2017

(65) Prior Publication Data

US 2018/0093855 A1   Apr. 5, 2018

(30) Foreign Application Priority Data

Oct. 4, 2016   (EP) ..................................... 16192245

(51) Int. Cl.
*B66B 5/02* (2006.01)
*B66B 1/32* (2006.01)
(Continued)

(52) U.S. Cl.
CPC .................. *B66B 5/02* (2013.01); *B66B 1/32* (2013.01); *B66B 9/00* (2013.01); *H02P 3/08* (2013.01); *H02M 7/06* (2013.01)

(58) Field of Classification Search
CPC ........... B66B 1/32; B66B 5/0031; B66B 1/36; B66B 5/00; B66B 1/343; B66B 13/24; B60T 17/22; F16P 3/147
See application file for complete search history.

(56) References Cited

U.S. PATENT DOCUMENTS

| 4,256,204 A | * | 3/1981 | Ando | ........................ B66B 5/02 187/288 |
| 2007/0272491 A1 | * | 11/2007 | Kattainen | ................. B66B 1/32 187/288 |

(Continued)

FOREIGN PATENT DOCUMENTS

| CN | 1871172 A | 11/2006 |
| CN | 104379479 A | 2/2015 |

(Continued)

OTHER PUBLICATIONS

European Search Report for EP 16192245.5 dated Mar. 31, 2017.

*Primary Examiner* — Marlon T Fletcher
(74) *Attorney, Agent, or Firm* — Birch, Stewart, Kolasch & Birch, LLP

(57) ABSTRACT

The invention refers to an elevator brake controller, comprising
  a brake supply circuit comprising a rectifier with a mains input side and a DC link output side, whereby in the mains input side and/or in the DC link output side at least one fuse is connected,
  a brake control circuit with at least one brake coil of an elevator brake, which brake coil is connected in series with a control switch configured to be controlled by an elevator control, which series connection of brake coil and control switch is connected to the DC link,
  a brake safety circuit which is connected between the brake supply circuit and the brake control circuit, which brake safety circuit comprises a first safety switch being connected in series with the brake coil as well as a second safety switch which is connected in parallel to the brake coil, whereby the first and second safety switches are configured to be controlled by an (Continued)

elevator safety circuit. This brake controller offers an improved cut-off safety in safety relevant situations.

20 Claims, 1 Drawing Sheet

(51) Int. Cl.
  *B66B 9/00* (2006.01)
  *H02P 3/08* (2006.01)
  *H02M 7/06* (2006.01)

(56) References Cited

U.S. PATENT DOCUMENTS

| | | | |
|---|---|---|---|
| 2013/0043097 A1* | 2/2013 | Widmer | B66B 5/02 |
| | | | 187/288 |
| 2014/0231181 A1* | 8/2014 | Rogers | B66B 1/32 |
| | | | 187/288 |
| 2015/0053507 A1* | 2/2015 | Kattainen | B66B 13/22 |
| | | | 187/288 |
| 2015/0329318 A1 | 11/2015 | Cambruzzi et al. | |
| 2016/0194180 A1* | 7/2016 | Kubota | B66B 5/02 |
| | | | 187/277 |

FOREIGN PATENT DOCUMENTS

| | | | |
|---|---|---|---|
| CN | 104837756 A | 8/2015 | |
| EP | 0149727 A1 | 7/1965 | |
| EP | 1 225 150 A1 | 7/2002 | |
| JP | 2011-195287 A | 10/2011 | |
| WO | WO 2013/178872 A1 | 12/2013 | |
| WO | WO 2014/086669 A1 | 6/2014 | |
| WO | WO 2014-166626 A1 | 10/2014 | |

\* cited by examiner

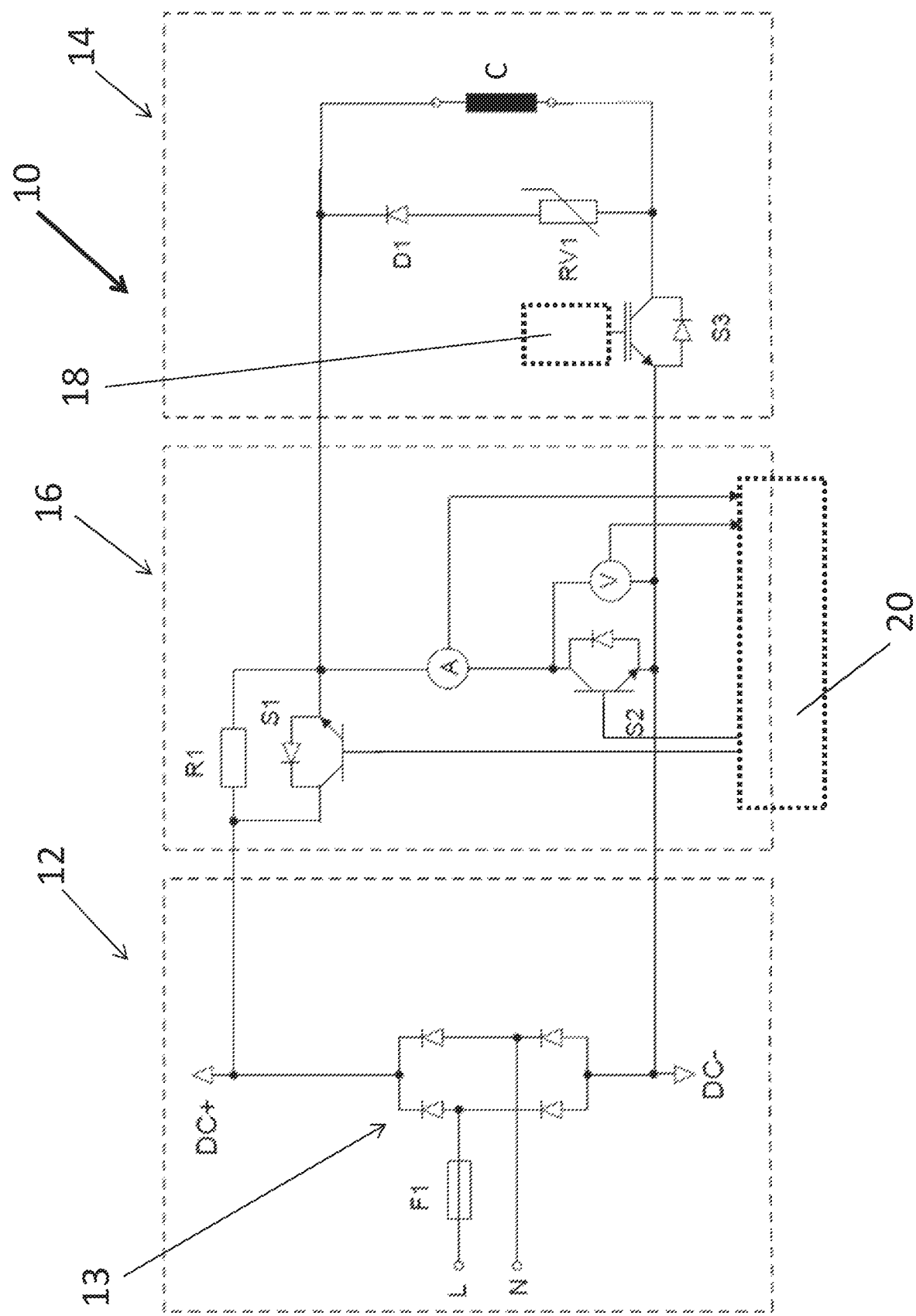

ELEVATOR BRAKE CONTROLLER

Elevators are generally products in which safety plays an essential role. One essential item in the safety of elevators is the reliable activation of the elevator brake in any case of normal operation and in case of safety problems. Accordingly, normally in elevators, electromechanical relays or contactors are used in connection with a corresponding safety circuit for the elevator brake which contactors open the power supply to the brake coil which immediately leads to the gripping of the elevator brake. Electromechanical relays are prone to wear out, which is a problem specially in high duty elevators e.g. in metro stations, hotels and office buildings. Relay operation is limited roughly to one million operations in most frequent use, which causes that a failed relay part needs to be replaced once a year. Thus, the down time of the elevator during a replacement after a relay failure affects the operation of the elevator in general. Another problem of using relays in brake control circuits is that relays are not intended for inductive load switching where specially the switch off operation is very stressing for the relay due to contact arcing caused by the inductive load. Relay datasheets typically specify the switching characteristics for resistive loads only. Finding acceptance and approval from official institutions regarding elevator safety for a relay based safety circuit used in inductive load switching is challenging since the relay manufacturers are not guaranteeing the relay operation for inductive loads in their specifications. If safety circuits are designed e.g. according to SIL1 safety requirements according to EN81-50 Table B.1 (Common measures to avoid and detect failures—Hardware design) it is required that components are used only within their specifications.

Generally, semiconductor switches are adapted for switching inductive loads. E.g. IGBT transistors are used in inductive cookers. On the other hand, the regulations regarding elevator safety are quite strict with regard to elevator brake safety. On the other hand provide semiconductor switches not the same level of safety as mechanical contactors because an essential disadvantage of using semiconductor switches in safety circuits is that they lack the normally closed contact of a forcibly guided relay that can be used for diagnosing the main contact short circuit. Therefore diagnosing faulty state needs to be made by other means, which is not easy for semiconductor switch. Semiconductor switch e.g. MOSFET can fail into short circuit, open circuit or partially conductive state. In earlier solutions electromechanical relays or contactors are used for similar circuits. The circuits have had high failure rates causing most of the drive module or brake controller field failures.

It is therefore object of the present invention to provide an elevator brake controller having a high degree of safety level and which is less susceptible to wear as current mechanical safety solutions.

The object of the invention is solved with an elevator brake controller according to claim 1 as well as with a method according to claim 12. Advantageous embodiments of the invention are subject of the dependent claims. Preferred embodiments of the invention are also described in the description as well as in the drawings of the application.

The inventive brake controller comprises a brake supply circuit comprising a rectifier with a mains input side and a DC link output side, whereby in the mains input side and/or in the DC link output side at least one fuse is connected. Furthermore, the brake controller comprises a brake control circuit with at least one brake coil of an elevator brake, which brake coil is connected in series with a control switch configured to be controlled by an elevator control. The series connection of brake coil and control switch is connected to the DC link of the brake supply circuit.

Finally, the elevator brake controller comprises a brake safety circuit which is connected between the brake supply circuit and the brake control circuit, which brake safety circuit comprises a first semiconductor safety switch which is connected in series with the brake coil as well as a second semiconductor safety switch which is connected in parallel to the brake coil, whereby the first and second safety switches of the brake safety circuit are configured to be controlled by an elevator safety circuit. Finally, the elevator brake controller comprises a voltage and/or current sensor which is connected to the DC link. The second safety switch is configured to be controlled dependent on the output signal of the voltage and/or current sensor.

In the inventive elevator brake controller the first safety switch acts as a replacement for the current mechanical contactors, whereby sufficient level of safety is maintained by monitoring the activity of the second safety switch via the voltage and/or current sensor whereby the ability of the second safety switch is checked to short-circuit the brake coil. Only if the result of this check is positive the first safety switch is controlled into its on state. Therefore a double safety is obtained on one hand with the first safety switch cutting the energy to the brake coil in any case of safety problems and on the other hand by the second switch short circuiting the brake coil.

Even, if during the safety problem the first switch erroneously is on, the second safety switch when short-circuiting the brake coil blows the fuse located in the means input side and/or DC link output side of the rectifier bridge. Thus, regardless of functional errors of the first safety switch proper cut-off is always ensured by the second safety switch, whereby the function of the second safety switch is monitored by the voltage and/or current sensor of the brake safety circuit. Accordingly, the inventive brake controller ensures an extraordinary high degree of safety without use of mechanical or other expensive or wear susceptible switching elements.

Preferably, parallel to the first safety switch, a resistor is connected, which resistor has a resistance value which is high enough as to not energize the brake coil to such extent that the elevator brake is operated. The current flowing through the resistor could then be used by the voltage and/or current sensor in the brake safety circuit to check the function of the second safety switch.

In a preferred embodiment of the invention, the resistor is a MELF resistor which ensures a high resistance value also in critical safety conditions.

Of course, the first and second safety switch are semiconductor switching elements, particularly IGBTs or MOSFETs.

In a preferred embodiment of the invention, the first safety switch is of the type default off. Thus the first safety switch in an off state if it does not receive any control impulses from the elevator safety circuit. Thus, by default it interrupts current flow to the brake coil which leads to the gripping of the elevator brake. This has the advantage that in any case of interruption of the control signals to the first safety switch, the elevator brake will grip and stop the movement of the elevator car. Accordingly, this solution has a quite high level of safety.

In a further preferred embodiment of the invention, the second safety switch is of the type default on. Accordingly, the second safety switch by default, i.e. in absence of any control signals, short-circuits the brake coil. In case of power off or any other interruption of the control impulses, the second safety switch will immediately short-circuit the brake coil which leads to the gripping of the elevator brake. If the first safety switch should be conducting based on a functional error the short-circuiting of the second switch immediately leads to the blowing of the fuse in the brake supply circuit. Accordingly, the inventive brake controller provides a high level of safety even in situations where a malfunction of the first and/or second safety switch may occur.

The fuse may be a one way fuse or preferably an automatic fuse which may be reset by a service technician.

In the invention, the brake supply circuit, the brake control circuit as well as the brake safety circuit are designated as separate circuits. It is of course obvious for the skilled person that different components of these circuits could be interconnected so that there is no clear border or delimitation between these parts of the inventive brake controller.

Preferably, the brake safety circuit comprises a current sensor connected in series with the second safety switch, whereby the output side of the current sensor is configured to be connected with the elevator safety circuit. Alternatively, the output of the current sensor can also be connected with a monitoring circuit of the elevator brake controller. In this connection it has to be carried out that the function of the elevator safety circuit regarding the brake controller can also be realized by a monitoring circuit belonging to the brake controller. Thus, a part of the elevator safety circuit can be substituted by a separate monitoring circuit of the elevator brake controller.

The invention also relates to an elevator comprising at least one elevator car moved by an elevator motor which elevator motor comprises an elevator brake whereby the elevator further comprises a brake controller for the elevator brake according to the above description.

Preferably, the elevator comprises a motor drive for the elevator motor having a DC link between a rectifier bridge and a converter bridge of the motor drive, which is usually configured as frequency converter. In this case, the DC link of the motor drive is common with the DC link of the brake controller, whereby the fuse is connected in series with the first safety switch and the brake coil. In this case, no separate DC link and no separate rectifier has to be provided as a separate brake supply circuit. Thus the brake supply circuit is realized by the DC link of the motor drive. Of course, in this case, the fuse is located in series with the first safety switch and the brake coil so that the short-circuiting of the second safety switch blows the fuse connected in series with the brake coil so that only the brake coil is de-energized leading to the gripping of the elevator brake. Anyway, this has no further effect on the operation of the motor drive itself. The motor drive could be controlled by another part of the elevator safety circuit.

Preferably, the elevator comprises an elevator safety circuit, which is connected to the control terminals of the first and second safety switches of the brake controller. The elevator safety circuit is furthermore connected to a current sensor in the brake controller and/or to a voltage sensor in the brake controller, whereby the control signals for the safety switches are configured to be dependent on the signals of the current sensor and/or voltage sensor so that the safety switches are configured to be operated depending on the signals of the current sensor and/or voltage sensor. Via this measure, the function of the second switch, i.e. the ability of the second switch to short-circuit the brake coil switch can easily be monitored with the current- and/or voltage sensor.

The first switch is only controlled into its non-default conducting state when the function of the second switch has been ensured. Thus the control signal of the first switch is dependant from the output signals of the current sensor and/or voltage sensor. In any case of malfunction of the first switch leading to its on state in a safety relevant situation the short-circuiting of the second safety switch will lead to the blowing of the fuse which reliably de-energizes the brake coil.

Finally, the invention relates to a method for ensuring the safety in a brake controller. In this method, the brake controller comprises a first safety switch which is connected in series with a brake coil and a control switch used to activate or deactivate the elevator brake dependent on the control signals of the elevator control. In this method, a second safety switch is connected in parallel to the brake coil so that in a safety relevant situation the first switch cuts-off the brake current while the second switch short-circuits the brake coil. This is a double protection in failure situations. Preferably, the function of the second safety switch is further monitored based on the signals of a voltage and/or current sensor connected in connection with the second switch. Thus, the first switch is only allowed to close after the function of the second switch has been checked positive via the output signals of the voltage sensor and/or current sensor. With respect to the effects and advantages of this inventive method, reference is made to the description of the inventive brake controller.

Preferably, the brake controller comprises a fuse in the brake supply circuit and the short-circuiting of the brake coil via the second safety switch leads to the blowing of the fuse so that the DC link of the brake controller is de-energized leading to the gripping of the elevator brake.

Preferably, a resistor is connected in parallel to the first safety switch, which resistor facilitates the monitoring of the function of the second safety switch. The resistor should have a comparably high resistance value so that the current flowing over the resistor does not lead to the energizing of the brake coil as to release the elevator brake. On the other hand, the current flowing via the resistor allows a proper measurement of voltage/current by the voltage/current sensor as to monitor the operation of the second safety switch.

In this connection it has to be mentioned that the first and second safety switches are of course semiconductor switches, preferably IGBT or MOSFETs.

The second safety switch—default on—can advantageously be e.g. a silicon carbide MOSFET which is available both in normally on and normally off type transistors.

In a best embodiment the second switch being a default on type is used to short circuit the supply in case of an unintended turn on of the default off first switch will occur, therefore preventing energy being fed to the brake. In this case the fuse in the supply will trip cutting the power from the brake supply circuit. Also other disconnection means maybe used instead of the fuse to bring the circuit into safe state. The fuse and the second switch are selected to enable the fuse tripping without failure.

The default off first switch has advantageously a parallel high impedance (resistor), made with a resistor, which is used for condition monitoring of the second switch. The resistor is preferably selected from such a technology that it only introduces failure modes of open circuit or a small change in resistance but does not introduce short circuit or partial conduction as failure modes. Thus it should have a comparably high impedance. For an example MELF resistors are considered such type of resistors. The resistance value is selected such that it is not sufficiently low to provide enough energy for brakes, but is able to cause a small but detectable voltage increase across the second switch if it is being controlled in non-conductive state. Then the resistor can be used to inject voltage and/or current to the second switch so that by controlling the on and off state of the second switch the switching capability of the second switch can be detected. Thus if it is detected that the second switch is able to conduct into short circuit then the controlling of the first switch in its on state can be enabled. The detection can be made based on voltage measurement connected parallel to the second switch and/or current measurement connected in series with the resistor.

Advantage of Invention

By using invented circuit it is possible to get rid of electromechanical relays without use of expensive isolated topologies for semiconductor based safe enabling circuits. Use of semiconductor switches for inductive load are using components in their intended operation conditions giving possibility to get electrical safety device status and approval for the circuit. The resistor injecting current to the node makes possible to have frequently performed diagnostic test the check the shorting capability of S2 switch e.g. at start of each sequence. In attached principle drawing the circuit is drawn in the dc link of brake controller but the same principle can be done in ac circuit as well. However for periodical checking location the safety circuit into dc link has advantage that the short circuit check can be significantly shorter in time meaning less than 10 ms, which is minimum required for the checking in 50 Hz ac circuit. Similar approach of using normally on type transistors could be used e.g. in replacing contactor based dynamic braking circuit on drive motor output.

Following terms are used as synonyms in the present patent application: first switch—first safety switch—first safety semiconductor switch; second switch—second safety switch—second safety semiconductor switch; impedance—resistor—MELF resistor.

It is obvious for the skilled person that the above-mentioned embodiments may be combined with each other arbitrarily.

The invention is hereinafter described via an example in the schematic drawing. In this drawing, FIG. 1 shows a circuit diagram of an inventive brake controller.

The inventive elevator brake controller 10 comprises a brake supply circuit 12 with a rectifier bridge 13 having an input side connected to mains L, N to which a fuse F1 is connected. The output side the rectifier bridge 13 is a DC link, DC+, DC−. The inventive brake controller 10 further comprises a brake control circuit 14 with a brake coil C connected in series with a control switch S3 which control switch S3 is controlled by an elevator control 18 to activate/de-activate the elevator brake. Parallel to the brake coil C, a commutation circuit for the brake coil with smoothing components could be connected as for example a diode D1 as well as varistor RV1.

These components are optional and replaceable by other per se well known components.

Between the brake supply circuit 12 and the brake control circuit 14, a brake safety circuit 16 is connected. The brake safety circuit 16 comprises a first safety switch S1 connected in series with the brake coil C and the control switch S3. Furthermore, the brake safety circuit 16 comprises a second safety switch S2 which is connected parallel to the brake coil C. Furthermore, the brake safety circuit 16 comprises a current sensor A connected in series with the second safety switch S2 as well as a voltage sensor V which is connected parallel to the second safety switch S2. The control terminals of the first and second safety switch S1, S2 as well as the outputs of the current and voltage sensors A, V are connected to an elevator safety circuit 20 which of course could also be realized by a monitoring circuit of the inventive elevator brake controller 10. Finally, parallel to the first safety switch S1, a resistor R1 is connected which resistor has a comparably high resistance value so that the elevator brake is not actuated by the current flowing through the brake coil C via the resistor R1.

The first safety switch S1 as well as the second safety switch S2 are semiconductor switches as for example IGBT transistors or MOSFETs. The first safety switch S1 is preferably default off while the second safety switch S2 is preferably default on. This means that in case no control impulses are inputted to the control terminals of the first and second safety switches S1, S2 via the elevator safety circuit 20, no current flows through the brake coil as the first safety switch is off and additionally the brake coil C is short-circuit by the second safety switch which is default on and thus connecting. Thus, a double safety in the switch-off function of the brake controller 10 is obtained. During the operation of the elevator, the function of the second safety switch S2 is monitored via the current sensor A as well as the voltage sensor V. Only after the function of the second safety switch is ensured via the sensor signals the first safety switch is enabled to be controlled into its on or conducting state (not-default!) to supply current to the brake coil to open the brake. If in a safety fault situation the first safety switch is properly working, it should cut off the current path between the DC link DC+, DC− and the brake coil C. But in case of any malfunction of the first safety switch S1 being still conducting the short-circuit of the brake coil C via the second safety switch S2 will blow the fuse F1 in the input side of the rectifier bridge 13 which leads to the immediate de-energization of the complete brake controller 10. Thus, a very safe brake controller topology is realized with the inventive elevator brake controller 10 of FIG. 1.

It is clear for the skilled person that the above described embodiments are not limiting the subject-matter of the invention which is limited by the appended patent claims only.

LIST OF REFERENCE NUMBERS

10 Elevator brake controller
12 brake supply circuit
13 rectifier bridge
14 brake control circuit
16 brake safety circuit
18 elevator control
20 elevator safety circuit
S1 first safety switch
S2 second safety switch
S3 control switch
A current sensor
V voltage sensor
R1 resistor—MELF resistor
F1 Fuse
DC+, DC− DC link (rectifier output side)
RV1 varistor (smoothing component)
D1 diode (smoothing component)
N, L mains phases (rectifier input side)

The invention claimed is:

1. An elevator brake controller, comprising:
   a brake supply circuit comprising a rectifier with a mains input side and a DC link output side, whereby in the mains input side and/or in the DC link output side at least one fuse connected;
   a brake control circuit with at least one brake coil of an elevator brake, which brake coil is connected in series with a control switch configured to be controlled by an elevator control, which series connection of brake coil and control switch is connected to the DC link; and
   a brake safety circuit which is connected between the brake supply circuit and the brake control circuit, which brake safety circuit comprises a first safety switch being connected in series with the brake coil as well as a second safety switch which is connected in parallel to the brake coil to short-circuit the brake coil, whereby the first and second safety switches are configured to be controlled by an elevator safety circuit.

2. The elevator brake controller according to claim 1, wherein the brake safety circuit further comprises a voltage- and/or current sensor connected to the DC link, whose output is configured to be connected to the elevator safety circuit.

3. The elevator brake controller according to claim 1, wherein the first safety switch is of the type default off.

4. The elevator brake controller according to claim 1, wherein the second safety switch is of the type default on.

5. The elevator brake controller according to claim 1, wherein parallel to the first safety switch a resistor is connected, which resistor has a resistance value which is high enough as to not energize the brake coil to such extent that the brake is operated.

6. The elevator brake controller according to claim 5, wherein the resistor is a MELF resistor.

7. The elevator brake controller according to claim 1, comprising a current sensor connected in series with the second safety switch, whereby the output side of the current sensor is configured to be connected with the elevator safety circuit.

8. The elevator brake controller according to claim 1, comprising a voltage sensor connected in parallel to the second safety switch, whereby the output side of the voltage sensor is configured to be connected with the elevator safety circuit.

9. An elevator comprising:
   at least one elevator car moved by an elevator motor, which elevator motor comprises an elevator brake; and
   the elevator brake controller for the elevator brake according to claim 1.

10. The elevator according to claim 9, comprising a motor drive with a DC link, which is common with the DC link of the brake controller, whereby the fuse is connected in series with the first safety switch and the brake coil.

11. The elevator according to claim 9, comprising an elevator safety circuit, which is connected to control terminals of the first and second safety switches of the brake controller, which elevator safety circuit is connected to a current sensor in the brake controller and/or a voltage sensor in the brake controller, whereby at least the second safety switch is configured to be operated dependent on the signals of the current- and/or voltage sensor.

12. The elevator brake controller according to claim 2, wherein the first safety switch is of the type default off.

13. The elevator brake controller according to claim 2, wherein the second safety switch is of the type default on.

14. The elevator brake controller according to claim 3, wherein the second safety switch is of the type default on.

15. The elevator brake controller according to claim 2, wherein parallel to the first safety switch a resistor is connected, which resistor has a resistance value which is high enough as to not energize the brake coil to such extent that the brake is operated.

16. The elevator brake controller according to claim 3, wherein parallel to the first safety switch a resistor is connected, which resistor has a resistance value which is high enough as to not energize the brake coil to such extent that the brake is operated.

17. The elevator brake controller according to claim 4, wherein parallel to the first safety switch a resistor is connected, which resistor has a resistance value which is high enough as to not energize the brake coil to such extent that the brake is operated.

18. A method for ensuring safety in a brake controller, comprising the steps of:
   connecting a first safety switch in series with a brake coil and a control switch;
   energizing the brake coil based on control signals of an elevator control; and
   connecting a second safety switch, different from the first safety switch and the control switch, in parallel to the brake coil to short circuit the brake coil in case of safety problems,
   wherein in case of a malfunction of the first switch, the second safety switch short-circuits the brake coil, blowing a fuse which is connected to the input side and/or output side of a brake supply circuit of the brake controller to cut off the power of the brake controller.

19. The method according to claim 18, wherein the function of the second safety switch is monitored with a voltage- and/or current sensor and the first safety switch is only enabled to switch on if the function of the second safety switch has been ensured.

20. The method according to claim 18, wherein as a first safety switch a default off switch is used.

* * * * *